J. ELLER & A. GOETZ.
Liquid-Measures.
No. 148,197.
Patented March 3, 1874.
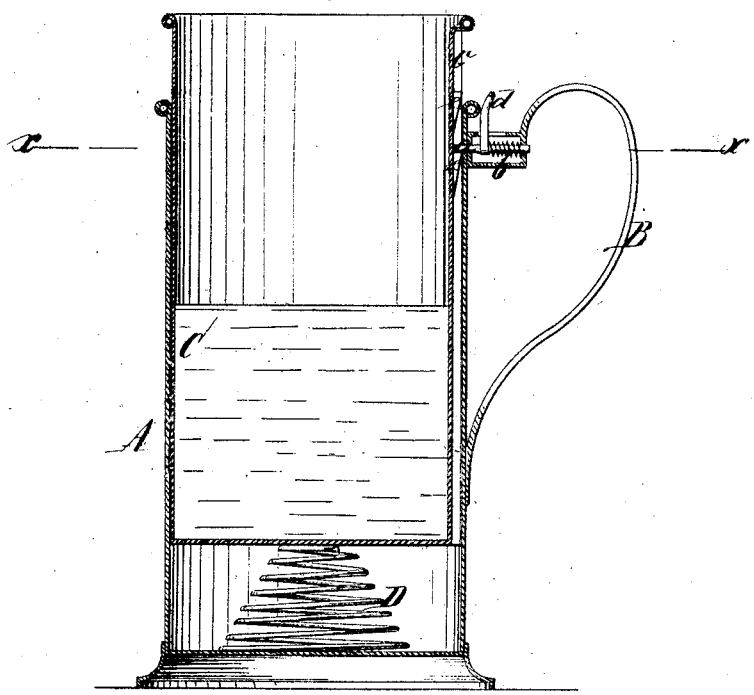
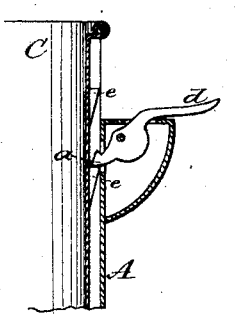
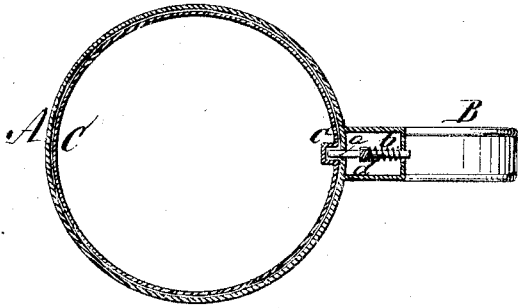
Witnesses:
Ernst Bilhuber
Henry Gintner
Inventors:
John Eller
Albert Goetz
pr
Van Santvoord & Hauff
attys

UNITED STATES PATENT OFFICE.

JOHN ELLER AND ALBERT GOETZ, OF HUDSON CITY, NEW JERSEY.

IMPROVEMENT IN LIQUID-MEASURES.

Specification forming part of Letters Patent No. 148,197, dated March 3, 1874; application filed November 24, 1873.

*To all whom it may concern:*

Be it known that we, JOHN ELLER and ALBERT GOETZ, of Hudson City, in the county of Hudson and State of New Jersey, have invented a new and useful Improvement in Liquid-Measures; and we do hereby declare the following to be a full, clear, and exact description thereof, which will enable those skilled in the art to make and use the same, reference being had to the accompanying drawing forming part of this specification, in which drawing—

Figure 1 represents a vertical central section of this invention. Fig. 2 is a horizontal section of the same. Fig. 3 is a detached sectional view of a modification of our invention.

Similar letters indicate corresponding parts.

This invention consists in the combination of two vessels, one fitting into the other and resting on a spring secured to the bottom of the outer vessel. With these two vessels are combined a catch and two or more teeth, or downward-tapering stops, in such a manner that when a certain quantity—say, one pint—of liquid is poured in the inner vessel, the same is depressed to such a point that the catch will fall in over the first stop, and, if a quart of liquid is poured in, the catch will fall in over the second stop, and so on, and by the combined action of the catch and the stops the inner vessel is prevented from dropping out while the same is being emptied.

In the drawing, the letter A designates a vessel made of sheet metal, and provided with a handle, B, of any convenient form or shape. Said vessel is made cylindrical, and in it slides a second vessel, C, which rests upon a spring, D, fastened to the bottom of the outer vessel. In the handle B is secured a retaining-dog, *a*, which is exposed to the action of a spring, *b*, that forces the same through a hole in the outer vessel into a groove, *c*, formed in the side of the inner vessel, as shown in the drawing. From the retaining-dog *a* projects a finger-piece, *d*, which serves to force said bolt back against the action of its spring. In the groove *c* are secured two or more teeth or stops, *e*, which are so situated that when a pint of liquid is poured into the inner vessel said vessel is depressed so as to allow the retaining-dog *a* to catch over the first stop, and if a quart of liquid is poured in, the retaining-dog *a* catches over the second stop, and so on; and as the retaining-dog *a* passes over each successive stop the clicking noise produced indicates that the inner vessel has received the requisite quantity of liquid. By these means beer or other liquids which produce a foam can be readily and quickly measured, and in pouring out the contents of the inner vessel, the retaining-dog *a* retains said vessel and prevents it from sliding out. When the contents have been poured out, and the measure has been turned up to a vertical position, the retaining-dog *a* is pressed back, and the inner vessel returns to its original position ready to receive a fresh charge.

In Fig. 3 we have shown a modification of our invention, in which the retaining-dog *a* is operated by gravity, thereby dispensing with the spring *b*. It is pivoted in the handle B, and is provided with a finger-piece, *d*, for releasing the inner vessel C. Owing to the weight of the finger-piece *d*, the same will have a tendency to drop downward; hence forcing inward the opposite end of the dog to engage with the teeth *e* on the vessel C.

What we claim as new, and desire to secure by Letters Patent, is—

The combination of an outer vessel, A, with an inner vessel, C, provided with tapered lugs *e*, arranged to slip past the catch when the inner vessel is pressed downward, substantially as described.

This specification signed by us this 21st day of November, 1873.

JOHN ELLER.
ALBERT GOETZ.

Witnesses:
W. HAUFF,
E. F. KASTENHUBER.